(12) United States Patent
Amar

(10) Patent No.: US 11,611,590 B1
(45) Date of Patent: Mar. 21, 2023

(54) SYSTEM AND METHODS FOR REDUCING THE CYBERSECURITY RISK OF AN ORGANIZATION BY VERIFYING COMPLIANCE STATUS OF VENDORS, PRODUCTS AND SERVICES

(71) Applicant: Proofpoint, Inc., Sunnyvale, CA (US)

(72) Inventor: Shmuel Amar, Shoham (IL)

(73) Assignee: Proofpoint, Inc., Sunnyvale, CA (US)

( * ) Notice: Subject to any disclaimer, the term of this patent is extended or adjusted under 35 U.S.C. 154(b) by 323 days.

(21) Appl. No.: 16/991,422

(22) Filed: Aug. 12, 2020

Related U.S. Application Data

(60) Provisional application No. 62/950,350, filed on Dec. 19, 2019, provisional application No. 62/945,465, filed on Dec. 9, 2019.

(51) Int. Cl.
| | |
|---|---|
| *G06F 21/00* | (2013.01) |
| *H04L 9/40* | (2022.01) |
| *G06Q 30/018* | (2023.01) |
| *G06N 20/00* | (2019.01) |
| *G06Q 10/0637* | (2023.01) |
| *G06Q 10/105* | (2023.01) |
| *G06Q 50/26* | (2012.01) |
| *G06Q 10/0635* | (2023.01) |

(52) U.S. Cl.
CPC ............ *H04L 63/20* (2013.01); *G06N 20/00* (2019.01); *G06Q 10/0635* (2013.01); *G06Q 10/06375* (2013.01); *G06Q 10/105* (2013.01); *G06Q 30/018* (2013.01); *G06Q 50/265* (2013.01); *H04L 63/1433* (2013.01)

(58) Field of Classification Search
CPC ..... H04L 63/20; H04L 63/1433; G06N 20/00; G06Q 10/0635; G06Q 10/06375; G06Q 10/105; G06Q 30/018; G06Q 50/265
See application file for complete search history.

(56) References Cited

U.S. PATENT DOCUMENTS

| | | | |
|---|---|---|---|
| 9,015,832 B1 * | 4/2015 | Lachwani | G06F 21/577 726/22 |
| 9,652,618 B1 * | 5/2017 | Lerner | G06N 20/00 |
| 9,665,628 B1 * | 5/2017 | Dubey | G06F 16/35 |
| 10,432,605 B1 * | 10/2019 | Lester | G06F 21/552 |
| 11,182,489 B2 * | 11/2021 | Kochura | G06F 21/554 |
| 11,196,627 B1 * | 12/2021 | Khoo | H04L 41/0816 |
| 11,244,757 B1 * | 2/2022 | Gabay | G06V 40/161 |
| 11,341,222 B1 * | 5/2022 | Caffey | H04W 12/06 |
| 11,425,160 B2 * | 8/2022 | Murray | H04L 63/1433 |

(Continued)

*Primary Examiner* — Don G Zhao
(74) *Attorney, Agent, or Firm* — FisherBroyles LLP; Alan D. Minsk

(57) ABSTRACT

A system and methods for determining the degree to which a vendor, supplier, or company's compliance or lack of compliance with a specific regulation or requirement contributes to, or could contribute to, the cybersecurity risk of an organization whose employees use that company's products or services. This source of risk may be evaluated for a plurality or set of vendors to determine an estimated total risk arising this source or set of sources. In response to evaluating the degree or level of this source of risk, the system and methods can be used to determine or select the apprFinal opriate security process or protocol that should be applied to employees, devices, systems, and networks to limit the risk to the organization.

20 Claims, 7 Drawing Sheets

(56) References Cited

U.S. PATENT DOCUMENTS

| | | | |
|---|---|---|---|
| 2017/0357812 A1* | 12/2017 | Lerner | G06N 20/00 |
| 2017/0359220 A1* | 12/2017 | Weith | H04L 41/0893 |
| 2018/0129806 A1* | 5/2018 | Bender | H04L 63/1425 |
| 2019/0044969 A1* | 2/2019 | Pilkington | H04L 63/1433 |
| 2019/0318366 A1* | 10/2019 | Carranza | G06Q 30/018 |
| 2020/0045080 A1* | 2/2020 | Wisniewski | H04L 63/0281 |
| 2020/0066071 A1* | 2/2020 | Budman | G07C 9/28 |
| 2020/0125746 A1* | 4/2020 | Joshi | G06F 21/62 |
| 2020/0259865 A1* | 8/2020 | Raff | H04L 63/0263 |
| 2020/0312304 A1* | 10/2020 | Asumu | G10L 15/22 |
| 2020/0349246 A1* | 11/2020 | Budman | G06V 40/23 |
| 2020/0358819 A1* | 11/2020 | Bowditch | G06K 9/6267 |
| 2021/0019657 A1* | 1/2021 | Wu | G06N 20/20 |
| 2021/0042581 A1* | 2/2021 | Kursun | G06N 20/00 |
| 2021/0056540 A1* | 2/2021 | McCauley | G06Q 20/3674 |
| 2021/0168123 A1* | 6/2021 | Rodriguez Bravo | H04L 63/20 |
| 2021/0176601 A1* | 6/2021 | Alsahlawi | G06Q 50/08 |
| 2021/0192620 A1* | 6/2021 | Golomb | G06N 20/20 |
| 2021/0288968 A1* | 9/2021 | Legault | H04L 63/08 |
| 2021/0319098 A1* | 10/2021 | Pogorelik | G06N 3/04 |
| 2021/0367963 A1* | 11/2021 | Murray | H04L 63/20 |

* cited by examiner

SYSTEM AND METHODS FOR REDUCING THE CYBERSECURITY RISK OF AN ORGANIZATION BY VERIFYING COMPLIANCE STATUS OF VENDORS, PRODUCTS AND SERVICES

CROSS REFERENCE TO RELATED APPLICATIONS

This application claims the benefit of U.S. Provisional Application No. 62/950,350, entitled "System and Methods for Verifying Compliance Status of Websites, Products and Applications," filed Dec. 19, 2019, the disclosure of which is incorporated, in its entirety (including the Appendix), by this reference.

This application incorporates by reference the entire contents of U.S. Provisional Patent Application No. 62/945,465 entitled "Systems and Methods for Modeling and Segmentation of People Oriented Risk in Cybersecurity Applications," filed Dec. 9, 2019.

BACKGROUND

Cybersecurity (also sometimes referred to as computer security or information technology (IT) security) relates to the protection of computer systems, computing devices, and networks from the theft of, or damage to, hardware, software, or electronic data, as well as from the disruption or misdirection of the services they provide. The data may include proprietary information, payment information, or personal information, and may be of interest to foreign state actors, competitors, or those seeking to commit fraud via identify theft.

While personal computing devices and servers located behind firewalls were formerly the primary "targets" of malicious actors, with the development and acceptance of "cloud-based" services, the set of targets has now expanded to include networks and remotely located servers used as part of a Software-as-a-Service platform. These remote servers are connected by one or more networks (e.g., wired, wireless, dedicated, etc.) to users who access data stored remotely or add data to remotely located data storage components. Users may also instruct processors in the servers to perform specified operations on the data. Over time, the combination of a greater number of users, greater amounts of potentially valuable data and information, and an increase in the potential entry points for a malicious actor have contributed to an increased cybersecurity threat. This increased threat or degree of cybersecurity risk has been responded to with the conventional tools available to security/IT analysts, where these tools are those associated with detecting and responding to threats that could result in unauthorized access to, or disruption of, IT assets, such as computers, servers, or networks. However, these conventional tools are of limited value in addressing cybersecurity risks in the changing threat environment and when addressing threats to the increased types and numbers of potential targets.

Conventional approaches and tools used to respond to and address the changes in the cybersecurity threat landscape suffer from one or more disadvantages. These include an inability to alter security protocols based on the behavior or situation of individual users, a need to expend a large amount of IT or security personnel time and resources on device-specific installations and updates, and in general, being based on a highly non-granular approach to providing security. These limitations of conventional approaches and tools become even more problematic in view of the expansion of cybersecurity attacks to include specific people or groups, as well as networks and remote servers or other infrastructure.

Systems and methods are needed for more efficiently and effectively responding to the recent changes in the cybersecurity threat landscape. Embodiments of the inventions described herein are directed toward solving these and other problems individually and collectively.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification of this patent, to any or all figures or drawings, and to each claim.

In recent years, the cybersecurity threat landscape has shifted from malicious actors targeting IT infrastructure (such as networks, servers, and computing devices) to actors targeting people who are users of devices, networks, and applications. One reason for this is that malicious actors have realized that some people are more likely to serve as an entry point for an attack on a system or network, or to provide access to other targets of interest. By focusing on specific people instead of a large number of devices, a malicious actor can sometimes improve their chances of obtaining access to the information they are interested in obtaining.

One goal of the approach of targeting users or groups of users is to leverage weaknesses in their behavior and hopefully trick them into exposing their credentials, thereby gaining access to data, email accounts, systems, cloud applications, servers, and networks of potential value to a malicious actor. Malicious actors also hope to leverage a user's identity and credentials to obtain access to other people, accounts, and IT assets within an organization.

While some malicious actors may still initiate broad-scale attacks on a large number of people because such attacks have a low, but still acceptable probability of being successful, in recent years actors have chosen to apply a more selective targeting approach. This more selective approach may include performing prior research on potentially valuable targets, including people having access to proprietary data and systems and/or those whose behavior suggests they are more likely to provide access to valuable data, and then initiating a highly customized attack on a target.

These types of customized attacks may be viewed as based on characteristics of a person that make them more likely to be a target of an attack and/or that make an attack more likely to be successful. As a result, cybersecurity teams are now facing a new "people" focused attack vector and would benefit from tools and approaches that can help them to cope with this growing problem. Among other benefits, embodiments of the system and methods described herein provide such tools and approaches and can assist an IT or cybersecurity professional to more effectively identify people or groups at higher risk from such customized, people-oriented attacks.

As will be described, in some embodiments, this may be accomplished by a segmentation process that evaluates multiple characteristics of a person that may make them a potential target or that may make an attack on that person more likely to be successful. Based on the segmentation, embodiments then recommend or allow a security analyst to apply an appropriate risk reduction or security protocol to each person or group of similarly situated people to reduce the likelihood of an attack and/or the likelihood of a successful attack.

As mentioned, conventional approaches and tools for addressing device-based cybersecurity threats have significant limitations and disadvantages when used to confront threats targeted at people or groups of people. These limitations of conventional approaches include:

- the difficulty in obtaining a comprehensive picture of cybersecurity, which combines multiple types of threats such as email related threats, cloud-based accounts and data, networks, etc.;
- conventional methods protect assets (i.e., physical or virtual devices and networks) rather than people, and are not applicable to monitoring and protecting such a large number of potential targets or objects (this is at least partly because the number of users is much higher than the number of assets);
- conventional methods do not consider non-threat related user characteristics that might influence security, such as user seniority, business function, personal behavior, department, etc.; and
- conventional methods do not include an effective mechanism for tracking progress and comparing the security status of an organization to that of other organizations as a way of benchmarking or evaluating the security efforts of the organization.

Embodiments of the disclosure are directed to systems, apparatuses, and methods for more effectively preparing for and responding to cybersecurity threats directed at people or at groups of people. In some embodiments, this is achieved by adopting a perspective on the security function that is people-centric instead of the conventional device-centric approach. This change in perspective leads to developing techniques to identify users most likely to be a target and/or thought to be most susceptible to a malicious attack and providing a security/IT team with tools to understand and manage possible threats to these users.

More specifically, in some embodiments this goal is accomplished, at least in part, by a process that automatically identifies companies, products, and services that may present risks by virtue of not satisfying one or more relevant standards, policies, regulations, or requirements. Typically, these standards, policies, regulations, or requirements relate to data privacy and/or protection against cybersecurity attacks directed at servers, devices and networks. By identifying such companies, products, and services (where the products or services may include applications, data processing systems, payment services, etc.), the risk of employees accessing websites operated by such companies or using their products or services can be evaluated, possibly mitigated, and factored into determining the cybersecurity risk presented to an organization from these sources.

In some cases, a reduction in the cybersecurity risk to an organization may be achieved by limiting employee, system, network, and device access to websites, applications, products, and services of companies/vendors that do not appear to be in compliance with a specific security policy or other requirement. In some examples, this policy or requirement may be one related to privacy, personal data, protection against network intrusion, etc.

Verification of compliance (or the inability to verify compliance) with a policy or requirement may be used as part of a governance policy for an organization. As part of evaluating corporate security or governance policies, it may be desirable to know if a vendor, website, service, or product satisfies certain regulations or complies with specific policies. This information can be used to assign a risk score or measure to each product or service that an organization and its employees use and also form part of determining the overall risk to an organization. In some cases, the result of evaluating this source of risk may be to motivate placing limits on employee access to the products or services of specific companies or suppliers. The results of a verification or compliance check can also be used to educate employees about the dangers of interacting with certain vendors, websites, products, or services and encourage them to take specific remediation efforts (such as changing credentials, blocking notifications, etc.). The compliance or non-compliance determination can also be used as the basis for security or risk prevention training for employees or other users of a website, vendor, product, service, network, etc.

Other objects and advantages of embodiments of the disclosure will be apparent to one of ordinary skill in the art upon review of the detailed description and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1A:
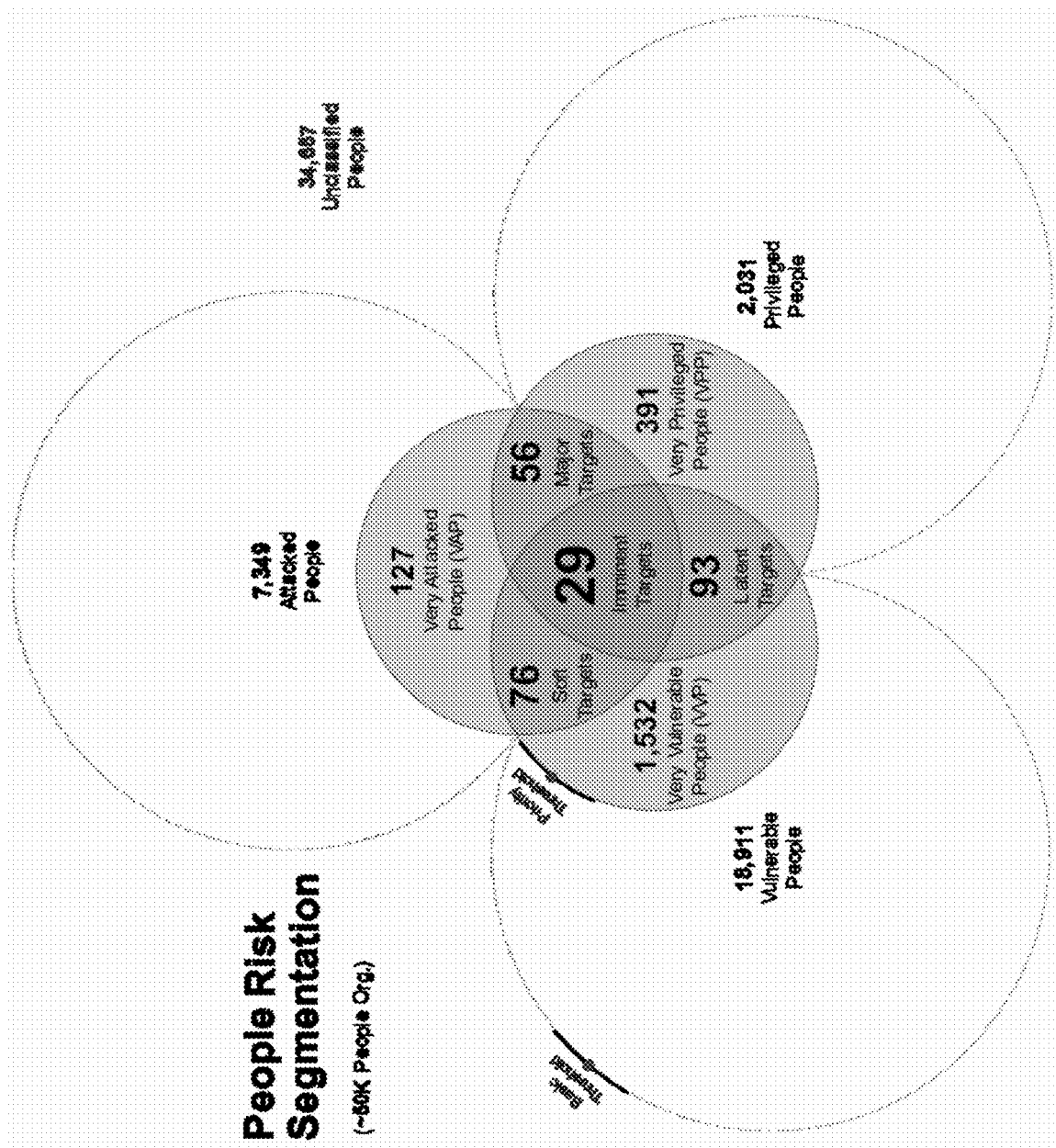
FIG. 1(a) is a diagram illustrating an example of how the members of an organization may be segmented into groups more or less likely to be the target of a cybersecurity attack and hence to present a risk based on (a) a general attribute of being privileged, vulnerable, or attacked, (b) belonging to a sub-group considered to be a higher risk member of the group having the general attribute and (c) belonging to an intersection of one or more of the sub-groups.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the invention will be described more fully herein with reference to the accompanying drawings, which form a part hereof, and which show, by way of illustration, exemplary embodiments by which the invention may be practiced. The invention may, however, be embodied in different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), or other form of computing or data processing system, device, or platform.

The processing element or elements may be programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or any other suitable form. The following detailed description is, therefore, not to be taken in a limiting sense.

Embodiments of the systems, methods, and apparatuses described herein are directed to implementations of an approach and techniques for more effectively preparing for, detecting, and responding to cybersecurity threats directed at people or at groups of people. In some embodiments, this is achieved by adopting a perspective on the security function that is people-centric instead of the conventional device-centric approach. This change in perspective motivates the development of techniques to identify users most likely to be a target of and/or susceptible to a malicious attack and providing a security/IT team with tools to understand and manage possible threats directed at these users.

As noted, malicious actors have begun applying a more selective approach to identifying potential targets for a cybersecurity attack. This more selective approach may include researching potentially valuable targets, including people having access to proprietary data and systems and/or those whose behavior suggests they are more likely to provide access to valuable data, and then initiating a highly customized attack on a target. These customized attacks may be based on, or attempt to take advantage of, characteristics of a person that make them more likely to be a target of an attack and/or that make an attack more likely to be successful (for example, as a result of a person's response to a simulated cybersecurity attack).

Identifying which people or group of people in an organization are at a higher risk for being the subject of a cybersecurity attack, or more likely to be the subject of a successful attack, and focusing resources on protecting those users is of high value (and a correspondingly high return on investment) to cybersecurity teams. In addition to identifying and protecting those users, embodiments can also provide ways to prevent those people or groups from being the subject of an attack, or at least reduce the possibility of an attack. This can be done by applying constraints on how those users access proprietary data, how they connect to the network, websites they may visit using the company network, etc.

As an example, highly attacked people, highly privileged people (e.g., people expected to have access to important information, networks, and systems containing important information, or to others in an organization, such as CEOs, CFOs, and GCs) and highly vulnerable people (those with a history or indication of being more susceptible to an attack, or who engage in conduct that represents vulnerable behavior) introduce higher risk of being the subject of an attack or of a successful attack. As a result, they should be subject to increased scrutiny and the application of appropriate security procedures by a security team, where the security procedure applied to each of the groups may specifically address why they are a potential target of an attack.

Further, in larger organizations, focusing solely on individuals and their devices, or applying security measures across an entire organization are not effective or efficient operational practices. Instead, segmenting people into groups with different types and levels of cybersecurity related risks (while also identifying reasons that make members of the group a worthwhile target and/or susceptible to an attack), and in response providing appropriate risk management and training resources to each segment is a more effective approach and also a more efficient allocation of resources for addressing cybersecurity risk.

Thus, while conventional cyber/information security risk management approaches and tools focus on measurement of risk associated with IT assets, the concept of "people centric risk" as described herein and in U.S. Provisional Patent Application No. 62/945,465 provides a measure of the cybersecurity risk a person or similarly situated group of people introduce to an organization. In some embodiments, this is accomplished by considering risk models that are customized to reflect how people as a vector fit in the traditional cybersecurity landscape.

Embodiments of the system and methods described in U.S. Provisional Patent Application No. 62/945,465 provide a cybersecurity team with techniques to segment people into different groups corresponding to different levels and types of risk—this process is termed "People Risk Segmentation (PRS)" herein. In one embodiment, these groups may include people that belong to one or more of a group of Attacked People (AP), Vulnerable People (VP), and Privileged People (PP). A risk score, metric, or level may be associated with each member of each group. The risk score, metric, or level may be a result of combining other scores, metrics, or levels obtained from an evaluation of factors that impact a person's likelihood of being attacked or of an attack being successful.

The factors evaluated, and the higher-level groups or categories are believed to be of significance for purposes of analysis and mitigating people-centric risk. The scores and assignment to a higher-level group can be used to sort a set of people, where the factors may suggest a person's likelihood of being a target of an attack (e.g., their previous history of being attacked and/or their access to potentially valuable information) and/or the likelihood of an attack being successful (e.g., based on their behavior or cybersecurity training experience).

In some embodiments, the definition of these groups may be as follows:
AP (attacked people)—people previously subjected to a cybersecurity attack, i.e., the target(s) of an attack;
VP (vulnerable people)—people whose behavior increases a chance of account take over or other harm (such as identify theft) in a case of an attack (e.g., people who click on the links within phishing emails or who have not completed some aspect of cybersecurity training); and
PP (privileged people)—people who have access to confidential information/systems within an organization and hence may provide entry points to data and systems of interest to malicious actors (e.g., finance, legal departments, sales, R&D, etc.). Such people generally include executives, project managers, people having access to valuable financial or technical data, etc.

Note that members of each of these groups may have specific characteristics or behaviors that make them a relatively more or less significant target for an attack.

Identifying and focusing on people with a relatively higher risk in each group provides subset groups of Very Attacked People (VAP), Very Vulnerable People (VVP), and Very Privileged People (VPP). These sub-groups may be identified by determining which group members have a profile, history, or behavior that causes them to exceed a predetermined (and in some examples, adjustable) threshold or level for one or more of a group's characteristics.

In some embodiments, the intersections of these sub-groups or subset(s) identify targets or sets of people at risk, with some at greater risk, or at greater risk from a specific type of attack. In some embodiments, these intersections are defined as: Imminent Targets (IT=VAP+VVP+VPP), Major Targets (MT=VAP+VPP), Latent Targets (LT=VPP+VVP) and Soft Targets (ST=VVP+VAP). Although risk prevention or reduction procedures can be applied to people in different groups (AP, VP, PP) or sub-groups (VAP, VVP, VPP), these sub-group intersections of people at relatively higher levels of risk or at greater risk from a specific type of attack can be the subject of (or basis for) specific risk control actions, training, interventions, monitoring, more immediate action, etc.

Segmenting the people in an organization into the groups, sub-groups and intersections of sub-groups (and hence into target types or profiles) described herein may provide a cybersecurity team with one or more of the following benefits:
The ability to associate people in an organization with their relative degree of risk, and in response to prioritize the application of cybersecurity prevention and remediation services;
The ability to correlate different security threats and modes of attack to obtain a fuller picture of the cybersecurity threat to an organization; and
The ability to take person or group-specific actions to reduce the likelihood of a successful cybersecurity attack and take proactive steps to prevent further attacks.

An example of this segmenting of employees or members of an organization that can be used to reduce the organization's cybersecurity risk is illustrated in FIG. 1(*a*). As mentioned, segmenting people into groups with different types and levels of cybersecurity related risks, and in response providing appropriate risk management and training resources to each segment or group is a more effective approach and a more efficient allocation of resources for addressing cybersecurity risk than one focused on individuals or taking an organization-wide approach.

FIG. 1(*a*) is a diagram illustrating an example of how the members of an organization may be segmented into groups more or less likely to be the target of a cybersecurity attack and hence to present a risk based on (a) a general attribute of being privileged, vulnerable, or attacked, (b) belonging to a sub-group considered to be a higher risk member of the group having the general attribute and (c) belonging to an intersection of one or more of the sub-groups. As shown in the figure, a group of people may be segmented into one of the three primary groups based on meeting a basic threshold value for membership in that group. The threshold value may depend upon previous behavior or levels of behavior, previous history of being the target of an attempted attack or being in a position where they have access to information or systems that may be of interest to a malicious party. Further, a subset of each group may present a relatively higher risk by having a behavior, history or position that indicates a characteristic exceeding a priority threshold for a particular group (e.g., this defines the members of the VAP, VVP, and VPP sub-groups).

The factors that might cause an employee to be a "target" of a cybersecurity threat or for an attempted attack to be successful suggest that a person's behavior may introduce greater cybersecurity risk to their organization. This risk can arise from a variety of actions or behaviors; these include the person visiting a website, providing data to a website or entering data into an on-line form, downloading an application onto their work computer, accessing a feature of a website, purchasing a product or service over the Internet, etc. These behaviors or actions by a person can increase the likelihood of their becoming the target of an attack and also can increase the threat or risk to the organization they work for and whose network and devices they use to engage in the behaviors. The threat or risk to the organization may take the form of a compromised network, the loss of proprietary data, an interruption in the delivery of services, etc.

This situation suggests that in addressing cybersecurity risk, both to individuals and to organizations, it is beneficial to develop and implement a process to identify suppliers, vendors, products, and services that comply (or fail to comply) with specific regulations or protocols, particularly those relating to network security, data security, or privacy. It also suggests that it is beneficial to an organization as a whole to limit use and interactions with a vendor, website, product, or service that fails to adequately comply with certain regulations or requirements. This will not only reduce the immediate risk to an organization's networks and devices, but can also impact its liability insurance, its ability to protect its own intellectual property, and in general, its ability to maintain control over access to systems, networks, devices, its own information, and that of customers.

A factor that increases the likelihood of an employee or other person being identified as a potential target for a cybersecurity attack or becoming the victim of "identity theft" is the risk they and their personal data (or in some cases, a customer's data) are exposed to by visiting a website, entering information into a form or using a product, service, or software application. This is because an employee device or company system may interact with a non-compliant website, product, service, or application, thereby exposing personal or proprietary data (e.g., user credentials or customer data) to greater risk of being acquired and misused. In addition, because providing such information or downloading software code or an application (whether intentionally or unintentionally) can compromise the security of the network and devices the employee is using, an employee's behavior can lead to a compromise of an organization's network, data storage, and devices. In some cases, this can result in unauthorized access to proprietary data or information. Note that in this context, a software application or software program may refer to an installable set of computer-executable instructions, a plug-in to an existing application or program, an application accessed via a software-as-as-service (SaaS) platform, etc.

Such misuse of proprietary data or information may include misappropriation of trade secrets, unauthorized access to research and development documentation, access to customer lists and information, theft of credentials, an increased ability to hack into a system or network and disrupt a business, etc. Further, use of a non-compliant vendor, product, or service may also increase the risk of malicious code being downloaded to an organization's internal network. In a broad sense, information that provides a malicious actor with something they can use to increase the likelihood of a successful attack, information that provides a malicious actor with a way to identify a potential target, or information that suggests a better way to formulate an attack directed at a person or company infrastructure may be available as a result of employee interactions with a non-compliant vendor or with a product or service provided by that vendor. Thus, identifying and limiting access to (or placing constraints on the use of) vendors, products, services, and websites that fail to comply with specific regulations or protocols can provide benefits to an organization by protecting the organization and limiting its risk exposure, and also by protecting individual employees.

As used herein, the terms or phrases "regulation" or "specific regulation" refers to one or more regulations, requirements, protocols, policies, or rules regarding data privacy, data security, network security or other form of device, data, system, or network protection. Examples of such regulations include but are not limited to HIPAA, GDPR, PrivacyShield, ISO2701, etc.

As used herein, the terms or phrases "interacts with the company", "interaction with a company," or "interactions with a company" refers to how an employee or member of an organization engages with a vendor or company whose compliance (or lack of) with a regulation is of interest or concern. Examples include but are not limited to using a product or service provided by a company, accessing a website or webpage associated with the company, or entering data into a form or webpage associated with the company.

As used herein, the term or phrase "cybersecurity risk" or "risk" "refers to a measure of the likelihood of a person, employee, group, sub-group, target type, or organization being the target of a cybersecurity attack or of the likelihood of an attack being successful. It may also refer to a measure of the potential damage to the organization if the user's account is compromised. In some examples, the attack may be intended to obtain unauthorized access to data or information, to devices, to networks, or to systems. In one example, an attack may be in the form of an attempt to obtain a person's credentials, such as username and password. The cybersecurity risk or risk may be expressed in any suitable manner, including, but not limited to a score, a range of scores, a descriptive level or degree, an indication of inclusion in a specific risk category or group, etc.

As used herein, the term "dynamic" as used with reference to the membership of a person, group, sub-group, or target type refers to the characteristic that the members of a group, sub-group, or target type, or the category a person is placed into, are not fixed and may change over time. Such changes can be due to a change in a person's function within an organization, a task they are assigned or have completed, a change to a threshold for "membership" in a group or sub-group, a time period over which certain events are counted, a change in a person's behavior, etc.

Embodiments of the system and methods described herein are directed to determining the degree to which a vendor, supplier, or company's (generally referred to as a vendor herein) compliance or lack of compliance with a specific regulation or requirement contributes to, or could contribute to, the cybersecurity risk of an organization. This risk could arise from employees' use of products or services, or otherwise interacting with the vendor, supplier, or company (such as by visiting a website and entering data into a form). This source of risk may be evaluated for a plurality of vendors, etc. to determine an estimated total risk arising from this source or set of sources. In response to evaluating the degree or level of this source of risk, the system and methods can be used to determine or select the appropriate security process or protocol that should be applied to employees, devices, systems, and networks to limit the risk to the organization.

As will be described herein with reference to the use of a risk model or risk modeling tree, a vendor's compliance or lack of compliance with a specific regulation or requirement can be a factor in determining the cybersecurity risk of an organization and also a factor in determining a person's risk. In some cases, a risk presented by a vendor may be translated, mapped, or converted into a risk measure or score. That measure or score may be combined with measures or scores representing other risk contributions to generate a person's score with regards to a group or category of risk (such as the AP, VP, and PP groups described), and hence is a factor in determining their total cybersecurity risk. A risk modeling tree or similar structure can be used to indicate how the various risk contributions are combined to generate the risk score for a group or category, and hence how a persons' exposure to a vendor contributes to their individual risk and to the risk they present to an organization. Thus, in some embodiments, the system and processes described herein may be used as part of generating a risk metric or score for a portion of a risk model, risk modeling tree or a data structure that serves a similar function. Such a model or structure identifies multiple sources of risk and the relationships between those sources and higher-level risk categories.

In some embodiments, a trained machine learning model may be used to generate a score, metric, level, relative measure, or normalized measure for one or more "leaves" or nodes of a risk model, risk modeling tree or other data structure representing the contributions to a risk category or higher-level group. In one example, a risk modeling tree defines/illustrates a hierarchy of risk attributes or risk factors that are believed relevant to assessing the cybersecurity risk posed by a person or group of people. In one example, a risk modeling tree includes a series of nodes or "leaves" arranged into categories, where the nodes represent risk factors or behaviors that are believed to contribute to specific categories or segments of cybersecurity risk (such as by contributing to the higher-level AP, VP, and PP categories described). A risk modeling tree is one example of a structure or organizing format (e.g., an Ontology) for the various forms or types of cybersecurity risk, although other forms, structures, data formats, etc. may also (or instead) be used in embodiments. The model outputs for the leaves or nodes may be combined to produce a more comprehensive risk evaluation for a person, group, sub-group, target group, etc. One such method of combining the risk measures (leaves) for a risk modeling tree into risk measures for higher-level risk categories is described in U.S. Provisional Patent Application No. 62/945,465.

In responding to the risk created by, or increased as a result of, accessing or using non-compliant products or services, the security process or protocol applied to a person, group, or organization may include one or more of:
- generating an alert when access to a specific website or application is attempted;
- blocking access to certain websites or applications;
- filtering or removing data before it is posted to a website or website form;
- providing training to employees regarding the risks associated with using certain vendors;
- prohibiting access by employees to specific sites, products or services;
- requiring regular verification of compliance by vendors with specific regulations or requirements; and
- enforcing a stricter security policy for certain employees (such as multi-factor authentication) for those employees who have access to proprietary networks or data.

Note that in most cases, there are multiple contributions to the total cybersecurity risk of an organization or an individual. With regards to an individual, the risk may be due to one or more attributes of the person. Such attributes may include but are not limited to factors that are relevant to the likelihood of the person being attacked (such as a previous history of attacks or level of access to data and systems) or the likelihood of an attack being successful (such as a person's behavior in response to an attack).

In some examples, the model(s) used to determine the compliance or lack of compliance of a vendor or website may be part of a set of trained models used to evaluate a person's overall cybersecurity risk or potential risk, with the outputs being combined to generate a score or metric representing the person's risk and also their contribution to the overall organization risk.

As described, in one embodiment, a machine learning model may be trained and used to determine the likelihood of a vendor (e.g., company, supplier, source, etc.) being in compliance with a specific regulation, policy, or requirement. This information can be used by an analyst to decide whether to apply a specific security protocol or procedure to the interactions of people within an organization with that vendor, such as with the vendor's products, services, or website. Although this is one embodiment in which the system and methods described may be used, some embodiments are directed to using the outputs of the trained model or models to determine how interactions with such vendors factor into the cybersecurity risk they present to an organization and to the organization's risk as a whole.

In one embodiment, the output of the trained model is an indication or likelihood of the compliance by a vendor with a specific regulation. This likelihood of compliance may be expressed in any suitable form or manner, including but not limited to a measure, score, range, degree (low, medium, high), relative measure, assignment to a category or grouping, etc. In one example, the model output is a number between 0-1 denoting the likelihood of compliance with the regulation or combination of regulations for which the model was trained. Note that the score, metric or measure may be expressed in other forms, with the implementation of other aspects of a risk evaluation system or process potentially being modified to utilize those other forms of risk measures.

In a general sense the segmentation and cybersecurity risk remediation systems and processes described in U.S. Provisional Patent Application No. 62/945,465 may perform one or more of the following methods, functions, processes, operations, or tasks:

(a) for each of a set of people:
  (1) obtain data related to cybersecurity attacks, attempted attacks and other events or activities relevant to cybersecurity for that person from security products and threat monitoring services;
      this may include signals and data related to security events or security-related events (i.e., including signals and data from security products and also from events or activities that may impact security, such as on-line presence, use of specific vendors or applications, etc.);
  (2) obtain data regarding the person's title, role and responsibilities from a directory of employees and information about access privileges to sensitive systems and data from a privilege management system; and
  (3) obtain data regarding the person's cybersecurity training experiences and responses to real or simulated threat scenarios and information about their behavior, e.g., browsing behavior, computer usage, etc.;
(b) depending on the form of the unprocessed data or signals, convert, transform, or otherwise process the data and/or signals to generate a normalized, common or canonical format representing each of the contributions to the overall cybersecurity risk for the person:
    this may include processing the signals and/or data to identify one or more aspects or characteristics of a cybersecurity attack or attempted attack, of a vendor or product, of another risk factor or contribution to risk, etc.;
    in some embodiments, the cybersecurity risk factors or contributions to cybersecurity risk may be those represented by a risk modeling tree, Ontology, or other data structure—such a tree or structure represents the contributions to risk and their relationships to determining categories of risk (such as Attacked People, Vulnerable People, and Privileged People) and total risk;

the processing may include application of experience to convert a signal or data into a risk score or measure (in absolute or relative terms);

the processing may include use of one or more trained machine learning models to transform raw data or signals into a risk score or measure for a specific contribution to risk;

(c) where applicable, input relevant data into one or more trained machine learning models (such as the model(s) described herein) to output one or more risk scores, measures, metrics, or levels corresponding to the input data associated with the person;

(d) combine the normalized scores or metrics for each risk contribution as indicated by the structure and organization of a risk modeling tree or other data structure to obtain a risk score or metric for the person for each of the primary risk categories (AP, VP, PP);

combine the primary risk category scores to obtain a total or overall risk score for the person, where the combination may be performed based on a selected process, weighting, etc.;

(e) define and apply the applicable threshold or filtering values for membership in the sub-groups of Very Attacked People, Very Vulnerable People, and Very Privileged People, and based on those, if applicable, assign the person to the appropriate sub-group or sub-groups (i.e., VAP, VVP, VPP);

(f) based on assignment or segmentation into one or more of the sub-groups (VAP, VVP, VPP), determine if the person is a member of any of the target groups found from intersections of the sub-groups;

as described herein, in some embodiments, these intersections are defined as: Imminent Targets (IT=VAP+VVP+VPP), Major Targets (MT=VAP+VPP), Latent Targets (LT=VPP+VVP) and Soft Targets (ST=VVP+VAP);

(g) allow a security analyst to select and apply an appropriate security process or protocol to the members of each group, sub-group, or target group;

(h) in addition to scoring and segmentation or assignment of each of the set of people in an organization (which may include all members or employees, those in a specific division, those working on a specific contract or project, etc.), determine one or more of:

the number of people in each group, sub-group, and target group;

the identity of each person in each group, sub-group, and target group;

the total risk scores or measures of all of the people in each group, sub-group, and target group; and combine the total risk category scores for all of the people in each of the primary groups (AP, VP, PP) to obtain a total or overall risk score for the organization, where the combination may be performed based on a selected process, weighting, etc.;

note that this combining may also be performed for the sub-groups or target groups to obtain a more granular "picture" of the risk aspects or contributions to risk of an organization for purposes of comparison after the application of risk reduction procedures, for comparison with other organizations, etc.;

(i) generate a display or user interface and enable a security analyst to investigate and evaluate the risk scores and contributions to risk for the organization as a whole from a person, a subset of people, a risk group, sub-group, or target group within the organization;

this may include providing selectable UI elements to enable an analyst to vary thresholds for sub-group membership, explore characteristics of a group (such as role, title, or other characteristic), sub-group, or target group, view contributions to the total risk score for a group, sub-group, or target group;

(j) allow the security analyst to apply an appropriate security process or protocol to the organization as whole; and (k) if desired, allow the security analyst to compare the organization to others in the same industry, location, revenue range, profit range, etc. with regards to overall risk scores, percentage of employees in a specific group, sub-group, or target group, etc.

The trained model(s) may be used in whole or in part to segment or classify a person into a specific group based on their characteristics, with each group, sub-group, or target type then being subject to potentially different security rules, policies, protocols, training, etc. In some embodiments, the machine learning model may be trained using historical data collected from multiple users and organizations, either with or without the addition of anonymized information from the organization whose employees or users are being evaluated.

In evaluating the total cybersecurity risk a person contributes to an organization, one factor involves their behavior. One such behavior is that of their concern for and care in protecting data and information, both their own and that of an organization's customers or clients. Because the use of non-compliant vendors, products, and services may increase the risk of data loss, a malicious network intrusion, identity theft, or other undesired event, determining which vendors are compliant with specific regulations or requirements can be very important in identifying and managing cybersecurity risk both to individuals and to an organization.

This disclosure describes a process or method for acquiring information related to a vendor, company, product, or service and using that information to determine if the vendor's website, services, or products (which may include downloaded software applications) are in compliance with one or more types or categories of regulations. These regulations may include, but are not limited to data privacy, network security, data security and other similar regulations. Examples include HIPAA, GDPR, PrivacyShield, ISO2701, etc.

In one example, the data used for training a machine learning (ML) model may include information regarding a plurality of companies and their products or services obtained from on-line searches, product reviews, articles, a website, web-page, or a product. In one example, the information is a combination of a URL (or link address) and a "snippet" of text from a website or web-page. The URL may be used to "crawl" the web-page or website and in doing so, capture information presented there. The search results and other information are reviewed to determine if the company (and by extension, its website and products or services) are compliant with a specific requirement or regulation. In some examples, this may be a combination of more than one requirement or regulation. The obtained information is used to construct a set of training data and labeling or annotating each set of company data with an indication of whether that data has been used to conclude that the company is in compliance with the requirement or regulation, or is not in compliance with the requirement or regulation. Note that for purposes of constructing the training data set, compliance or a lack of compliance is typically determined by a human annotator, although not exclusively.

Each set of data for a company is labeled or annotated, followed by training a machine learning model using a combination of the data sets and labels. The labels represent the desired output or decision of the trained model and serve to "teach" the model how to associate the input attributes (the URL+text snippet, although other input data may be used in the training process) with the desired output information (an indication of whether the company is compliant with a specific requirement or regulation). After training, the model operates to receive as an input a new set of information related to a company or product and respond by operating to output an indication of whether the company (or product or service) is compliant with a requirement or regulation that the model has been trained to detect. Note that once trained, the model can automatically "predict" the probability or confidence level in one or more outputs representing the likelihood of a company being compliant with a specific regulation or being compliant with a set of regulations (such as being compliant with both regulation A and regulation B).

Based on the output of the trained model, a possible security policy or action can be identified and implemented with regards to the vendor/company and its websites, services, or products. The policy may include one or more of:
  generating an alert when accessing a certain website or using a certain product or service;
  blocking access to a website;
  initiating a more detailed investigation of a vendor's compliance or lack of;
  placing restrictions on the use of certain products or services, placing restrictions on entry of certain categories of data into a form on a website;
  providing additional education or instruction to employees prior to having interactions with a vendor or company; or
  providing other IT or risk monitoring systems or networks with information about employees using non-compliant vendors or companies, to assist with attack monitoring, risk analysis, risk prevention, etc.

The security policy may be applied to an employee's devices and/or to the systems and networks of the organization they work for to limit or prevent harm arising from accessing the suspected or non-compliant website or using the non-compliant products or services.

In some cases, restrictions or other actions may be applied to an entire organization to limit the cybersecurity risk arising from interactions with a particular company or vendor. In some cases, the risk presented by interactions of employees with a particular company or vendor may be considered in determining the overall cybersecurity risk of an organization, evaluating its compliance with specific regulations or policies, determining its internal data protection policies, determining its list of approved vendors, determining its insurance premiums, etc.

At present, if performed at all, this type of security analysis relies on the manual work of analysts or workers to find and detect whether an application or product is compliant or not. Unfortunately, this conventional approach is difficult to scale, costly, labor intensive, requires a degree of expertise, and is prone to human error.

Embodiments of the system and methods described herein are directed to determining whether a vendor's or company's website, services, or products comply with a specific requirement or regulation, and hence whether accessing that website or using that product or service could expose a user or the user's employer to risk. In some cases, a risk may arise because the website or product contains malicious code that could be downloaded to a device accessing the site. In some cases, the website may not be a secure place to enter personal information or credentials. In some cases, the website may be an entry point for a hacker or malicious actor to be able to access a network connected to a user's device. Thus, although the risk may initially be risk to a user, that risk could be transferred to another party, such as the user's employer. As a result, the risk resulting from a user's actions may be a factor in the overall risk profile or risk exposure of their employer and also that of any people or devices that connect to a network to which the user connects.

Further, as mentioned, the systems and methods for compliance verification (or lack of) described herein may also be used as part of a governance policy for an organization. As part of evaluating security or governance policies, it may be desirable to know if a website, supplier, vendor, company, product, or service satisfies certain regulations or complies with specific protocols. In some examples, this information can be used to assign a risk measure to each product or service that an organization and its employees use.

For example, a non-GDPR compliant product being used to store customer information or data by a group of sales engineers not only creates a risk of legal exposure to an employer for non-compliance, but also risk arising from potential theft and misuse of customer data (such as for purposes of fraud, identify theft, obtaining clues to credentials, network hacking, etc.). The total risk exposure due to use of non-compliant products and services can be substantial, which is why identifying non-compliant companies, products, and services can be of great importance.

When non-compliant companies, products, or services are identified, that information may be used, as an example, in the following ways:
  1. by blocking or regulating access to websites, products, services, or applications that are not compliant (e.g., not satisfying the requirements of GDPR for protection of private information) by an administrator in order to protect an organization's employees; and/or
  2. used as part of determining the overall cybersecurity risk attributable to a given vendor, company, supplier, service, or product. This risk may be used by a governance system for an organization or network to decide if a company, website, service, or product should be blocked from use, permitted to be used, accessed only from specific places or using specific devices, monitored for attempted attacks, etc.

In response to determining that a company, website, product, service, or other item is not compliant (or likely is not compliant) with a specific regulation or set of regulations, a security process or protocol may be applied to a user, to a group of users, or to an organization. The security process or protocol applied may include actions such as generating an alert when access to a website or application is attempted, blocking access to certain websites or applications, filtering or removing data posted to a website or form, providing training to employees regarding the risks associated with visiting a specific website or using a product, prohibiting access by employees to specific sites, enforcing a stricter security policy for some employees, such as multi-factor authentication (MFA), etc.

As mentioned, in one example use case, the output(s) of the trained model may be used as part of constructing an overall risk score or metric for a person, a group of people, or for an organization. In this case or example, the direct or indirect risk presented to visitors to a particular website (or to users of a product or service) may be considered in determining the cybersecurity risk to an organization that employs the people who visit the website or who use the product or service. This aspect of the cybersecurity risk may arise because of the risk of credential theft or identity theft or result from the downloading of malicious code which then propagates to other devices and systems within an organization's network.

The risk arising from visiting a particular website or using a product or service is a contributor to the overall risk that a person or group of people may expose themselves to or expose their employer to. Thus, it is a factor or behavior that can be considered when segmenting people into cybersecurity risk groups, sub-groups, targets, or categories. Note that the segmentation process is dynamic, as is membership in the groups, sub-groups, or target types. A person may move between the groups, sub-groups, or target types in response to changes in their role, seniority, security training, behavior or other factors.

As a result of the segmentation, embodiments enable a cybersecurity analyst to perform a set of functions, including but not limited to:

- Set or modify a security policy/protocol applicable to a specific group, sub-group, or target type;
- Set or modify a cybersecurity training program applicable to a specific group, sub-group, or target type;
- Compare one organization's security risk profile to that of another organization;
- Implement a risk prevention program for a specific group, sub-group, or target type;
- Implement a specific remediation policy in response to a successful attack on a group, sub-group, or target type;
- Monitor and evaluate the cybersecurity risk to an organization over time, including monitoring of at-risk people or groups, attack methods (the threat vector), sources of attacks and successful attacks;
- Compare one organization's security/attack-prevention expenditures and approaches to that of another organization;
- Allocate or reallocate cybersecurity resources and infrastructure to at-risk groups, sub-groups, or target types in response to a dynamic change in membership of a group, sub-group, or target type;
- Analysis of the reasons or factors responsible for a person being moved from one group, sub-group, or target type to another; for example, a change in the magnitude of the attacks, a change in a person's privileges, or the introduction of new behavior vulnerabilities; and
- Setting a policy for other security products or monitoring services to block or detect certain actions of employees on non-compliant websites or uses of products or services from non-compliant vendors:
  - this might include preventing the entry of personal data into a form, or the generation of an alert or warning when a form is presented by a non-compliant website or vendor;
  - preventing access to specific websites from employee accounts;
  - preventing specific types of operations when visiting a website or using a specific vendor's products or services (such as payments, access to networked data storage, access to local computing resources, etc.).

As described, in some embodiments, a machine learning model is trained to automatically determine or classify a company or the company's website, products, or services with regards to compliance with one or more requirements or regulations. These requirements or regulations may relate to privacy, network security, system integrity, data practices, etc. As will be described further with reference to FIGS. 1(b) and 2, this is accomplished by generating a set of training data for the model that includes multiple examples of relevant data.

For each of a set of vendors or companies, the training data includes information that may be indicative of, or able to be used to determine a company's compliance with one or more types of compliance requirements. The data or information may be obtained from Internet searches, website contents, product information, product reviews, etc. The data or information for a company are associated with a label or other indicator of the compliance or lack of compliance with a specific requirement or regulation. The examples and labels are input to the model for purposes of training the model. When trained, the model will operate to respond to an input sample of "new" data by providing an output that indicates the probability of a company associated with the data being in compliance with the specific regulation or requirement.

Figure 1B:
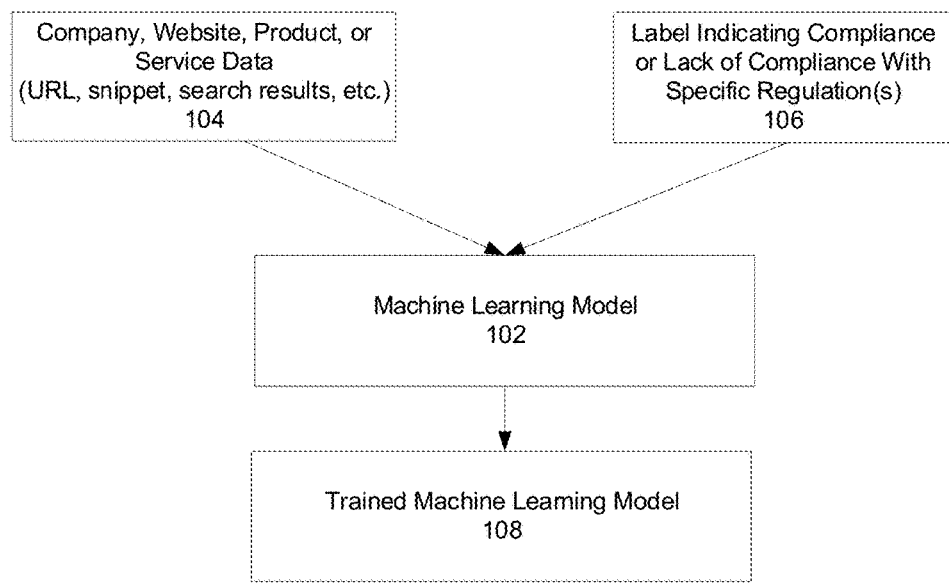
FIG. 1(b) is a diagram illustrating how a machine learning (ML) model may be trained to assist in determining whether a vendor, company, website, product, or service is in compliance with a specific regulation or type of compliance requirement, in accordance with an embodiment of the system and methods described herein.

FIG. 1(b) is a diagram illustrating how a machine learning (ML) model may be trained to assist in determining whether a vendor, company, website, product, or service is in compliance with a specific regulation or type of compliance requirement, in accordance with an embodiment of the system and methods described herein. As shown in the figure, in one example, a machine learning model 102 may be trained using a set of training data. For each of a plurality of vendors or companies, the training data may include information regarding the company and its products or services 104 obtained from crawling a webpage or website, performing searches, etc. In addition, the input to the model includes a corresponding label, indicator, or annotation 106 for each company's input data, specifying whether that set of inputs was indicative of compliance or a lack of compliance with a specific regulation or policy (or with a combination of regulations or policies). The sets of data and labels are input to the model to teach the model how to respond to the input data, producing a trained machine learning model 108. When trained, the model will operate to respond to a "new" set of input information (such as a URL and text snippet from a webpage) by providing an output that indicates whether the information is indicative of compliance or a lack of compliance. In some cases, the output may be a relative measure of the likelihood of compliance, such as a confidence level in (or probability of) the company being compliant.

Figure 2:
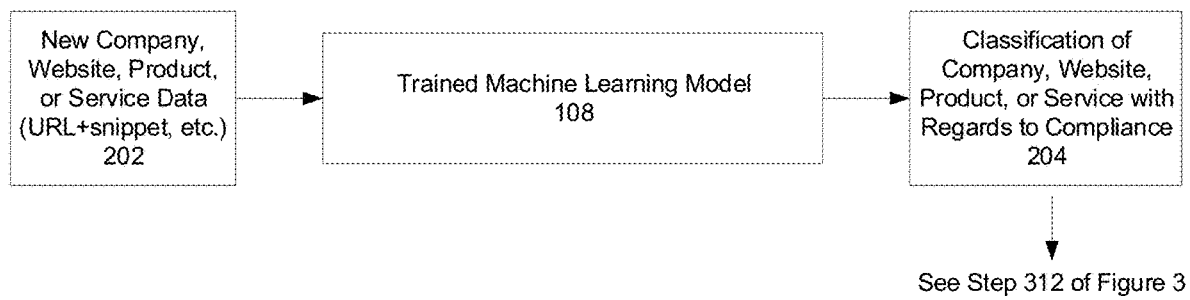
FIG. 2 is a diagram illustrating how the trained ML model of FIG. 1(b) may be used to classify a website, product, service, application, or company/vendor with regards to compliance with one or more specific types of compliance requirements, in accordance with an embodiment of the system and methods described herein.

FIG. 2 is a diagram illustrating how the trained ML model of FIG. 1(b) may be used to classify a website, product, service, application, or company/vendor with regards to compliance with one or more specific types of compliance requirements, in accordance with an embodiment of the system and methods described herein. As shown, a new set of data 202 (one not used as part of the training data) is input to the trained machine learning model 108. In response, the model provides an output 204 which represents a classification of the input sample data (and hence the associated company, website, product, or service) with regards to its compliance with respect to a specific regulation or requirement. As mentioned, in some cases, the output may be a relative measure of the likelihood of compliance, such as a confidence level in the company being compliant.

Figure 3:
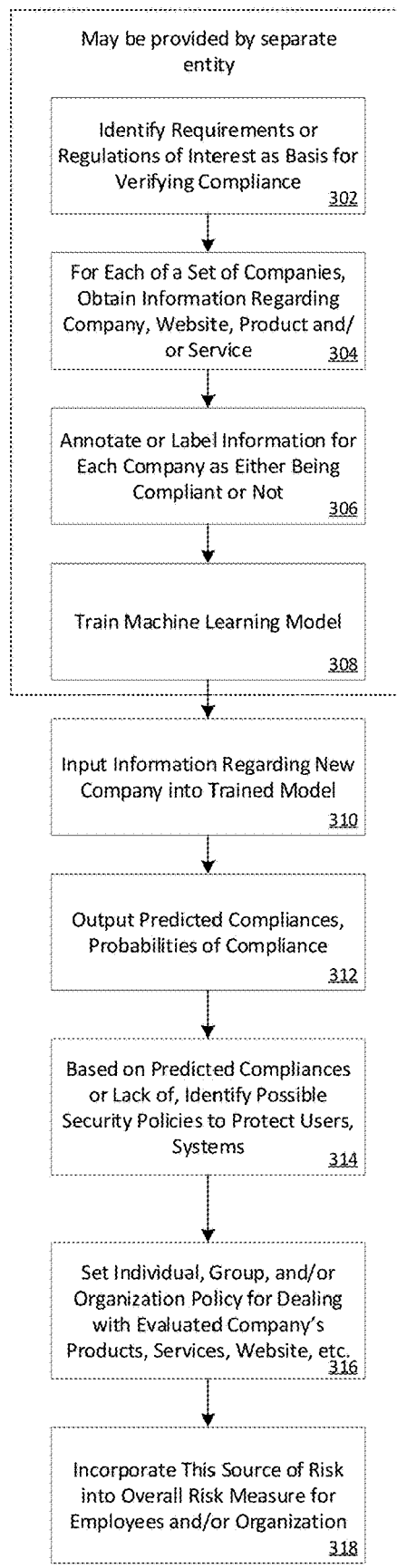
FIG. 3 is a flowchart or flow diagram illustrating a method, process, operation or function for determining the compliance status of a website, product, service, application, or company/vendor and in response setting a security policy for employees, networks, or systems regarding accessing or using the website, product, service, or application of the company/vendor, in accordance with an embodiment of the system and methods described herein.

FIG. 3 is a flowchart or flow diagram illustrating a method, process, operation or function 300 for determining the compliance status of a website, product, service, application, or company/vendor and in response setting a security policy for employees or systems regarding accessing or using the website, product, service, or application of the company/vendor, in accordance with an embodiment of the system and methods described herein. As shown in the figure, the process 300 uses a trained machine learning model 308. This model may be provided by an outside entity or constructed and trained by an entity practicing the classification process described herein.

At step or stage 302, a set of requirements or regulations of interest are identified. These are used as a basis for finding relevant information for use in training a machine learning model to determine whether a set of input data indicates compliance or a lack of compliance with the requirement(s) or regulation(s). Examples of such requirements or regulations include, but are not limited to or required to include, HIPAA, GDPR, PrivacyShield, ISO2701, PCI, or other requirement or regulation of interest. Typically, such requirements or regulations relate to network security, privacy, data security, financial transaction security, etc. The regulations or requirements may be specified as individual regulations or as a combination of regulations (e.g., the model may be trained to determine compliance with both HIPAA and GDPR). Specifying the regulation or regulations of interest assists in determining the type of information that will be sought and used for training the model—this may be reflected in the keywords used in searches, the websites checked for an indication of compliance, the product information accessed, the reviews or surveys accessed, etc.

At step or stage 304, for each of a set of companies, information is obtained that may be used to form a set of training data. Such information may relate to a company, a company's products, or a company's services, etc. The information may include a website link and other information obtained by one or more of "crawling" a webpage or website, performing a search for compliance related terms and processing the results, processing documents, finding a list of compliant products or companies, etc. The obtained information is reviewed and used to determine if it supports a conclusion that the company (or its products or services) is either in compliance with a requirement or regulation or is not in compliance. This review of the obtained data is typically performed by a human annotator but may be performed in part or in whole by an automated process. If needed, the acquired data or information may be pre-processed by cleaning HTML entities, tokenizing the words related to compliance for the webpage body, processing the URL, or other applicable and relevant method.

The obtained data is reviewed and evaluated, and then the set of data for a company is annotated or labeled with an indication of whether the company is in compliance or is not in compliance (step or stage 306). The sets of company related data and associated labels are then used to train the model (step or stage 308). This involves providing the model with multiple sets of (a) data and (b) an associated label so that the model can "learn" how to classify a set of input data with regards to whether it indicates compliance or not.

After it is trained, the model will respond to input data regarding a "new" company (or a product or service), such as a URL link and a snippet of text from a webpage, and in response output an indication as to whether the input data supports a conclusion that the company is in compliance with a requirement or regulation. In some cases, the trained model may output a probability or confidence measure indicating the likelihood of the company being in compliance or not being in compliance with the regulation or regulations which the model has been trained to recognize from the input data.

Next, data for a "new" company is obtained and processed (if necessary) before being input to the trained model (step or stage 310). This data may include a website or webpage URL and a snippet of text from a web-page. As noted, the output of the trained model is a classification or prediction as to the compliance or lack of compliance of the company (or product, etc.) represented by the input data. The output may include a probability or level of confidence as to the compliance or lack of compliance with regards to one or more requirements or regulations (step or stage 312). This may be expressed as a likelihood of compliance with each of one or more regulations (e.g., prob (A), prob (B), . . . ) or as a likelihood of compliance with a combination of regulations (e.g., prob (A+B)).

In some examples, the probability or likelihood of compliance score or value may be taken into consideration when deciding if interactions with a company's products or services is permitted, permitted subject to restrictions, or not permitted. In some examples, this may be decided based on a comparison of the probability or confidence level score with a predetermined threshold value, where the threshold value may be based on a level of acceptable risk to an organization or set of people. The level of risk may be subject to change by user input or adjusted automatically based on historical data or trends in cybersecurity incidents.

For example, a user may want to set a threshold value for accepting a likelihood of compliance measure based on consideration of whether usage of a model output is more sensitive to error (thus preferring precision). In other situations, the user may want to set a lower threshold based on based on whether usage of a model output is more sensitive to no compliance decision being made (thus preferring recall). In one example, a threshold value may be selected by considering a balance between the sensitivity of the approach to false positives and to false negatives. A higher threshold value will result in a lower false positive rate, while a lower threshold value will result in a lower false negative rate. A grid search algorithm (e.g., brute force) can be used to evaluate threshold options using a validation set (a section of the training data) and thereby enable selection of a threshold value that maximizes results with respect to the balance between false positives and false negatives that is most applicable for a task or decision process.

Based on the compliance or lack of compliance, an organization may identify or decide upon a security policy or policies to be applied to accessing a website, using a product, using a service, engaging or otherwise interacting with a vendor, etc. (step or stage 314). The policy or policies may be ones applied to employees, vendors, internal networks and devices, the organization as a whole, etc. After identifying one or more potential policies, an organization may set a specific policy for controlling access to a website, use of a product or service, contracting with a vendor, etc. (step or stage 316).

In some embodiments, this policy or risk management process might include one or more of:
blocking access to a website;
generating an alert if a website is accessed;
training employees regarding certain risks associated with interactions with a vendor;
initiating a formal compliance inspection or investigation once or at a regular interval
typically, a review of a company/vendor for its compliance status may be performed at a regular interval or when triggered by a specific event of the vendor (merger, acquisition, achieving certain growth or operational metrics, etc.);
preventing storage of certain data (e.g., personal, credit card, proprietary) on a specific website;

preventing the execution of certain computing, data entry, or data access functions when visiting a website or using a product or service of a specific vendor;

preventing entering certain data into a form on a website; or preventing providing certain information to a vendor, etc.

Further, the type and degree of risk posed by a non-compliant company (or website, product, or service, etc.) may be incorporated into an overall cybersecurity risk measure, metric, or evaluation for an employee, group of employees, network, or organization (step or stage 318). For example, use of non-compliant vendors may represent a behavior related contribution to risk for a set of employees, and therefore be a factor to be considered when determining risk as defined or represented by a risk model.

Figure 4:
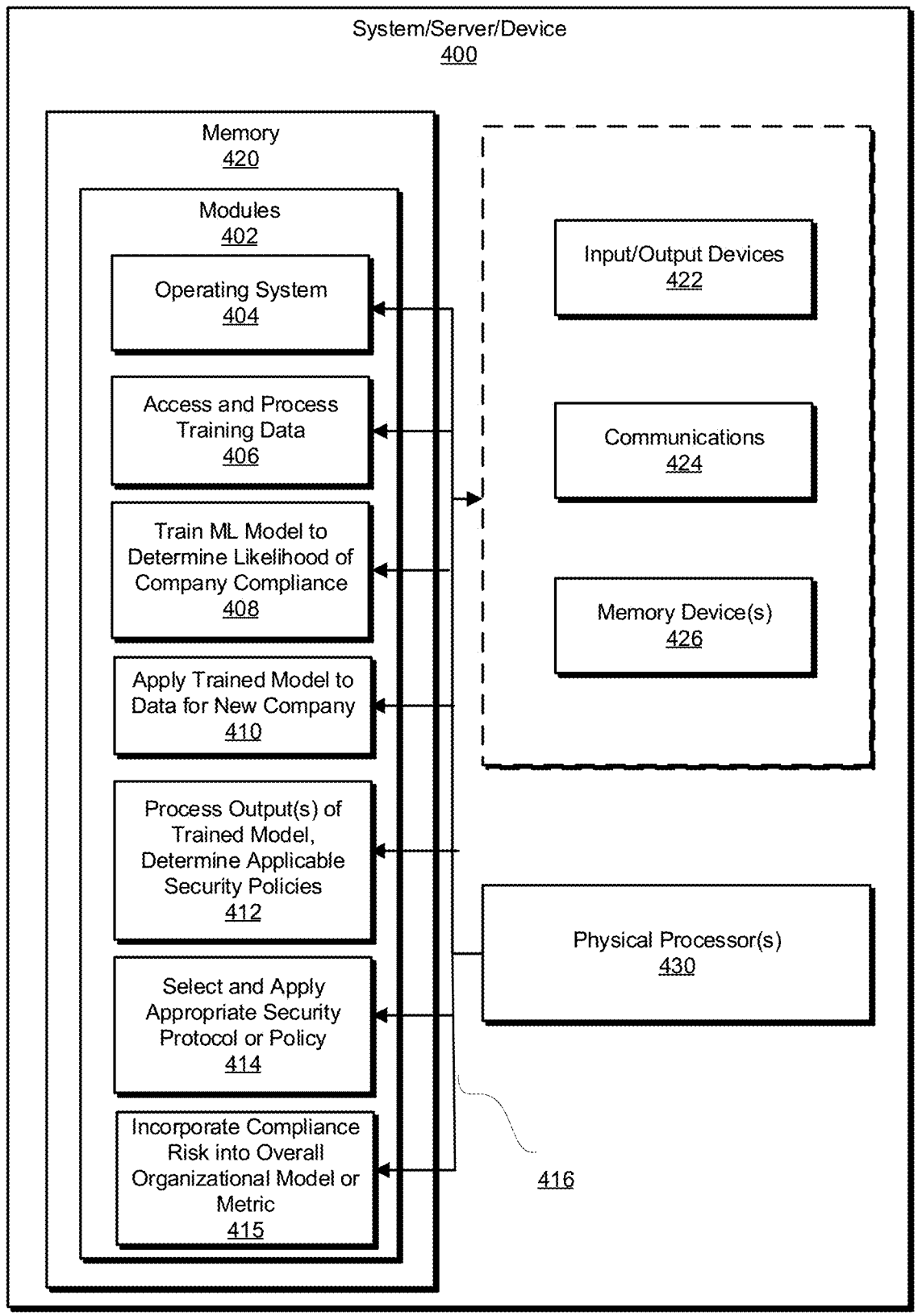
FIG. 4 is a diagram illustrating elements or components that may be present in a computer device or system configured to implement a method, process, function, or operation in accordance with an embodiment of the invention.

FIG. 4 is a diagram illustrating elements or components that may be present in a computer device, server, or system 400 configured to implement a method, process, function, or operation in accordance with an embodiment of the invention. As noted, in some embodiments, the inventive system and methods may be implemented in the form of an apparatus that includes a processing element and set of executable instructions. The executable instructions may be part of a software application and arranged into a software architecture. In general, an embodiment of the invention may be implemented using a set of software instructions that are designed to be executed by a suitably programmed processing element (such as a GPU, TPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a specific function, method, process, or operation that is implemented by the module or sub-module. Such function, method, process, or operation may include those used to implement one or more aspects of the disclosed system and methods, such as for:

Training a machine learning model using information about a set of companies, products, or services and a label indicating whether each company, product or service is in compliance with a specific requirement or regulation. Examples of such information include, but are not limited to or required to include:

web search engine results of the company name, product, or service with the compliance regulation or policy name(s)(such as GDPR, HIPAA);

online websites owned by the company or associated with the product or service containing compliance, requirement or regulatory information;

online information about the company, product, or service;

surveys, reports or articles discussing compliance with specific regulations;

industry groups that monitor or market their members' compliance or certification;

Applying the trained machine learning model to data regarding a different company, product, or service (not one used in the training process), the trained model operating on the input data or information to generate an output representing an indication of whether the different company, product, or service complies with or is likely to comply with a requirement or regulation (or combination of) which the model has been trained to evaluate compliance with (for example, a model may output a number on a normalized scale, a reference to a relative degree or likelihood, etc.);

The model output may include a probability or confidence level in the likelihood of compliance with one or a combination of regulations, policies, requirements, protocols, etc.;

If this probability or confidence level exceeds a predetermined threshold value, then interactions with the company and its products and services may be allowed;

If this probability or confidence level does not exceed the predetermined threshold value, then interactions with the company and its products and services may be subject to one or more security policies, protocols, restrictions, or procedures;

Note that depending upon the form of the output produced by a model, the confidence level may not be used or needed. For example, if the model is trained to output a score or metric that is intended to indicate the relative likelihood of compliance, then the confidence level may not add any further information. To determine an optimal threshold with respect to the training set, one can use grid search (e.g., brute force search) for finding an optimal threshold. A higher threshold will result in fewer false positives, while a lower threshold will result in fewer false negatives. The threshold value(s) chosen will typically depend on the use case (e.g., the decision being made based on the model output) and how sensitive a system is to false positives or false negatives;

Based on the generated output of the model (for a likelihood of compliance falling below a threshold), identifying one or more security policies, protocols, restrictions, or procedures that could be applied to protect a person or organization from the risk posed by a non-compliant company, product, or service;

Note that the security policy, protocol, restriction, or procedure applied may be specific to the regulation or requirement being considered—for example, if the regulation or requirement relates to network security, then the policy applied would typically involve protection of networks from intrusion or limiting the harm that might occur from unauthorized access;

Deciding upon and applying one or more specific security policy, protocol, procedure, restriction, or requirement to an organization, to its employees, or to a network or system to reduce the cybersecurity risk arising from a non-compliant company, product, or service, where as noted, the security measure(s) applied will generally depend on the type or nature of the compliance regulation or requirement. For example, non-GDPR compliant websites or vendors may be restricted by a security policy to not allow any upload or download of data or of personal data;

If applicable, implementing a more granular policy to condition, restrict, or block access by an organization and/or its employees with respect to certain types of interactions with a non-compliant company, product, or service, such as;

allowing partial use behind a firewall;

allowing use when accessed via a VPN or specific application;

allowing access/use with specific networks or devices;

preventing storage of certain data on a website; or allowing access when used in conjunction with a specific risk-monitoring software application;

If a company or product is in compliance with a requirement or regulation (or has a sufficiently high probability or likelihood of being complaint), then applying a security policy that permits access to a company's website and/or use of its products and services; and Repeating an evaluation of a company on a regular basis to detect changes in compliance status, etc.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As mentioned, FIG. 4 is a diagram illustrating elements or components that may be present in a computer device or system 400 containing a set of modules 402, with each module containing executable instructions that when executed by an electronic processor implement a method, process, function, or operation in accordance with an embodiment of the invention.

As shown in the figure, system 400 may represent a server or other form of computing or data processing device. Modules 402 each contain a set of executable instructions, where when the set of instructions is executed by a suitable electronic processor (such as that indicated in the figure by "Physical Processor(s) 430"), system (or server or device) 400 operates to perform a specific process, operation, function or method. Modules 402 are stored in a memory 420, which typically includes an Operating System module 404 that contains instructions used (among other functions) to access and control the execution of the instructions contained in other modules. The modules 402 in memory 420 are accessed for purposes of transferring data and executing instructions by use of a "bus" or communications line 416, which also serves to permit processor(s) 430 to communicate with the modules for purposes of accessing and executing a set of instructions. Bus or communications line 416 also permits processor(s) 430 to interact with other elements of system 400, such as input or output devices 422, communications elements 424 for exchanging data and information with devices external to system 400, and additional memory devices 426.

As shown in FIG. 4, modules 402 may contain one or more sets of instructions for performing a method that is described with reference to FIG. 3. These modules may include those illustrated but may also include a greater number or fewer number than those illustrated. For example, Access and Process Training Data Module 406 may contain instructions that when executed perform a process to access for each of a set of companies, data regarding the company, its products and services, and assist a user to create a corresponding label indicating compliance or a lack of compliance of a company with a regulation of interest. Train ML Model to Determine Likelihood of Company Compliance Module 408 may contain instructions that when executed perform a process to train a machine learning model to respond to data regarding a company and in response generate or output an indication or probability of compliance or non-compliance with a regulation or combination of regulations.

Apply Trained Model to Data for New Company Module 410 may contain instructions that when executed perform a process to receive as an input data regarding a "new" company, product, or service (not one used as part of the training data) and generate as an output a probability of the company's compliance or lack of compliance with a specific requirement or regulation. Process Output(s) of Trained Model, Determine Applicable Security Policies Module 412 may contain instructions that when executed perform a process to (if needed) convert or transform the output(s) of the model into an applicable security policy or protocol. This may involve, for example, mapping a model output to a set of applicable policies, where different model outputs are mapped to different sets of potential policies. In such an example, some of the policies may be stricter and some less strict, reflecting the presumably lower risk from interacting with a vendor that is sufficiently likely to comply with a specific regulation or requirement.

Based on the suggested/applicable security policies or protocols, Select and Apply Appropriate Security Protocol or Policy Module 414 may contain instructions that when executed perform a process to select and apply a specific set of security measures or practices to an organization (and to its employees and networks) with regards to accessing a specific website, interacting with a vendor, or using a specific product or service. Further, the risk from non-compliance or reduction in cybersecurity risk from compliance may be incorporated into an overall measure of risk for a person, group of people, or organization by the execution of instructions contained in Incorporate Compliance Risk into Overall Organizational Model or Metric Module 415.

Figure 5:
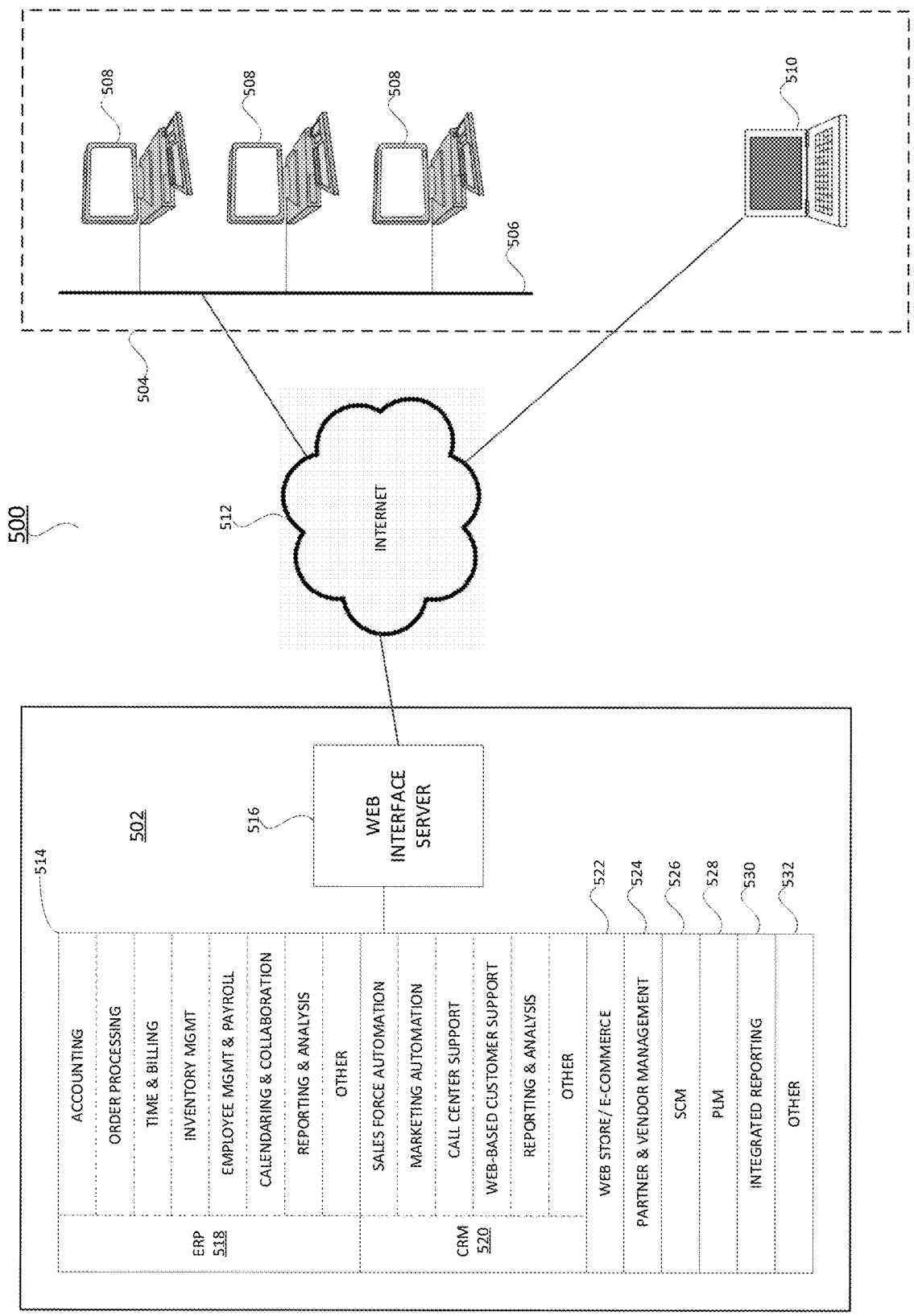
FIGS. 5-7 are diagrams illustrating an architecture for a multi-tenant or SaaS platform that may be used in implementing an embodiment of the systems and methods described herein.
Figure 6:
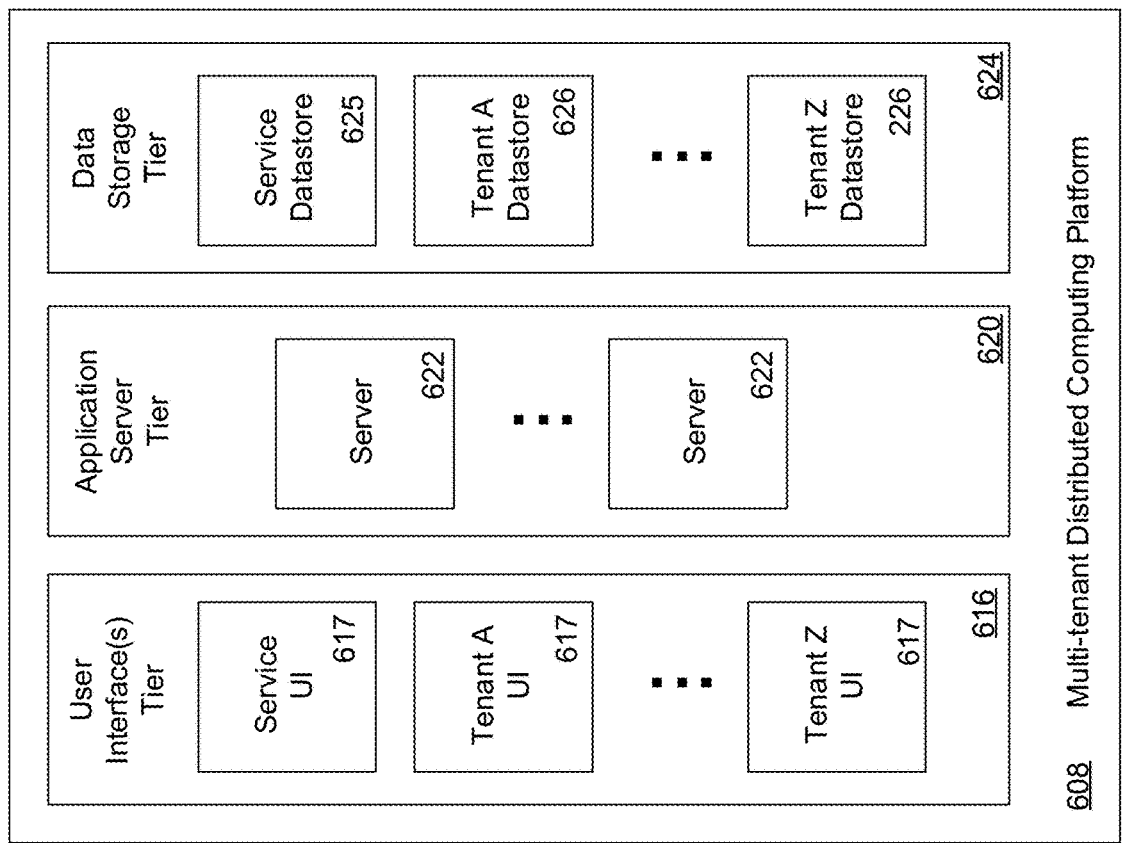
Figure 7:
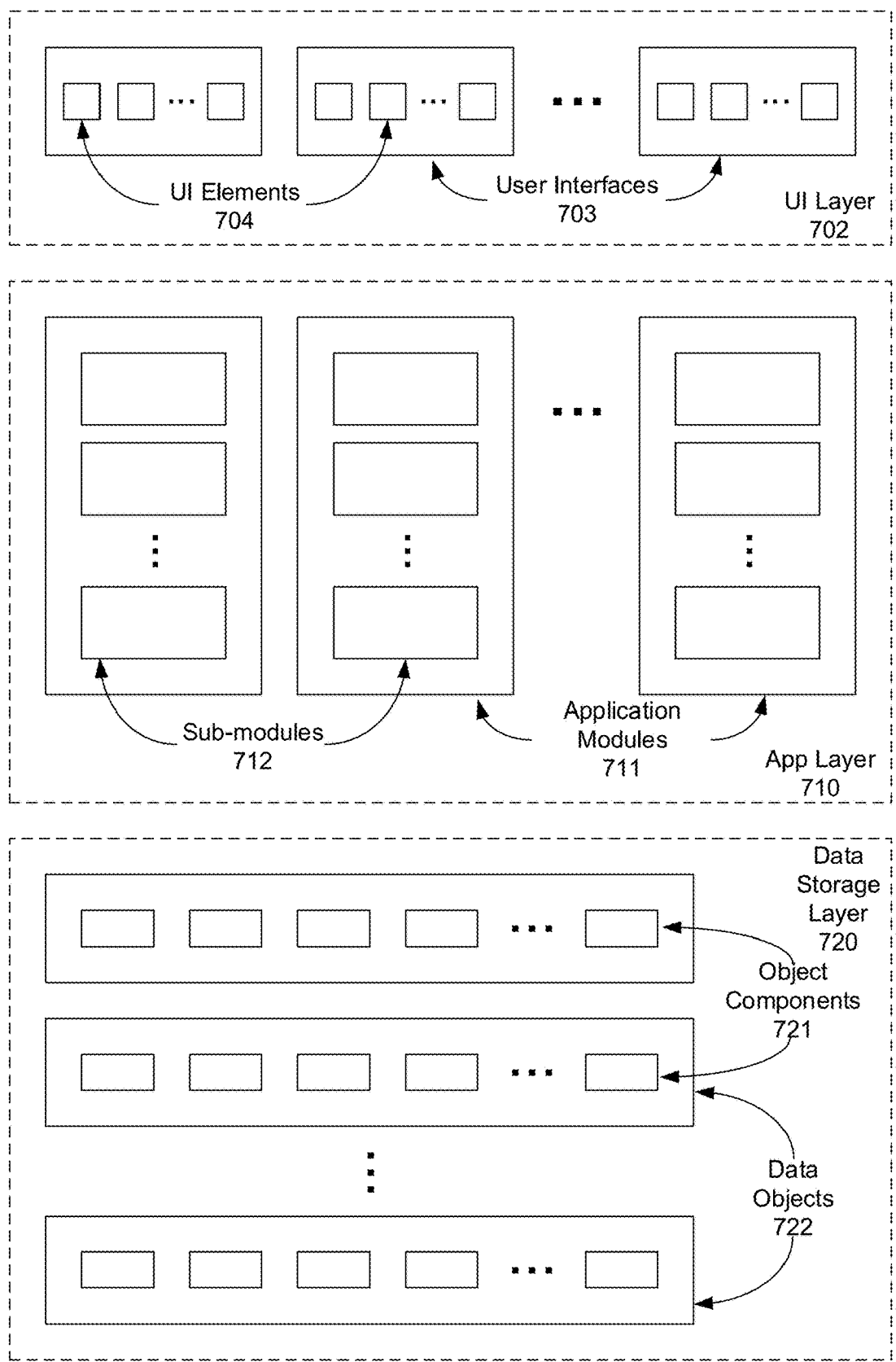

In some embodiments, the functionality and services provided by the system and methods described herein may be made available to multiple users, with each user having an account maintained by a server or server platform. Such a server or server platform may be termed a form of Software-as-a-Service (SaaS). FIG. 5 is a diagram illustrating a SaaS system, including an integrated business system and an enterprise network in which an embodiment of the invention may be implemented. FIG. 6 is a diagram illustrating elements or components of an example operating environment in which an embodiment of the invention may be implemented. FIG. 7 is a diagram illustrating additional details of the elements or components of the multi-tenant distributed computing service platform of FIG. 6, in which an embodiment of the invention may be implemented.

Note that although FIGS. 5-7 illustrate a multi-tenant or SaaS architecture for the delivery of ERP and CRM business-related applications and services to multiple accounts/users, such an architecture may also be used to deliver other types of data processing services and provide access to other business-related applications. For example, in the context of the present application, such an architecture may be used to provide email analysis and filtering services, network cybersecurity services, risk evaluation services, employee segmentation services, risk remediation services, etc. through access to one or more applications or models.

Each account may correspond to a separate user, corporation, or organization. In some examples, each account may correspond to a subset of the employees of a corporation or members of an organization.

As noted, in some embodiments, aspects of the invention may be implemented in the context of a multi-tenant, "cloud" based environment (such as a multi-tenant business data processing platform), typically used to develop and provide Internet/web-based services and business applications for end users. This exemplary implementation environment will be described with reference to FIGS. 5-7. Note that embodiments of the invention may also be implemented in the context of other computing or operational environments or systems, such as for an individual business data processing system, a private network used with a plurality of client terminals, a remote or on-site data processing system, another form of client-server architecture, etc.

FIG. 5 is a diagram illustrating a system 500 in which an embodiment of the invention may be implemented. Enterprise network 504 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 504 is represented by an on-site local area network 506 to which a plurality of personal computers 508 are connected, each generally dedicated to a particular end user, such as a service agent or other employee (although such dedication is not required), along with an exemplary remote user computer 510 that can be, for example, a laptop computer, tablet computer, or smartphone of an employee having internet access through a public Wi-Fi access point, or other internet access method. The end users (consumers) associated with computers 508 and 510 may possess an internet-enabled smartphone or other electronic device (such as a PDA, tablet, laptop computer) having wireless internet access or other synchronization capabilities. Users of the enterprise network 504 interface with the integrated business system 502 across the Internet 512 or another suitable communications network or combination of networks.

Integrated business system 502, which may be hosted by a dedicated third party, may include an integrated business server 514 and a web interface server 516, coupled as shown in FIG. 5. It is to be appreciated that either or both of the integrated business server 514 and the web interface server 516 may be implemented on one or more different hardware systems and components, even though represented as singular units in FIG. 5.

In a typical example in which system 502 is operated by a third party for the benefit of multiple account owners/tenants, each of whom is operating a business, integrated business server 514 comprises a set of business-related application. These applications may include an ERP module 518 and further comprises a CRM module 520. In many cases, it will be desirable for the ERP module 518 to share methods, libraries, databases, subroutines, variables, etc., with CRM module 520. In some examples, ERP module 518 may be intertwined with CRM module 520 into an integrated Business Data Processing Platform (which may be single tenant but is typically multi-tenant).

The ERP module 518 may include, but is not limited to or required to include, a finance and accounting module, an order processing module, a time and billing module, an inventory management and distribution module, an employee management and payroll module, a calendaring and collaboration module, a reporting and analysis module, and other ERP-related modules and functionality (eCommerce, point of sales, product information management, demand/material requirements planning (MRP), purchasing, content management systems (CMS), professional services automation (PSA), human resources management, and employee calendaring and collaboration).

The CRM module 520 may include, but is not limited to or required to include, a sales force automation (SFA) module, a marketing automation module, a contact list module (not shown), a call center support module, a web-based customer support module, a reporting and analysis module, a returns management authorization module (RMA), a loyalty program support module, and other CRM-related modules. The integrated business server 514 (or multi-tenant data processing platform) further may provide other business functionalities including a web store/eCommerce module 522, a partner and vendor management module 524, and an integrated reporting module 530. An SCM (supply chain management) module 526 and PLM (product lifecycle management) module 528 may also be provided. Web interface server 516 is configured and adapted to interface with the integrated business server 514 to provide one or more web-based user interfaces to end users of the enterprise network 504.

The integrated business system shown in FIG. 5 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

FIG. 6 is a diagram illustrating elements or components of an example operating environment 600 in which an embodiment of the invention may be implemented. As shown, a variety of clients 602 incorporating and/or incorporated into a variety of computing devices may communicate with a distributed computing service/platform 608 through one or more networks 614. For example, a client may incorporate and/or be incorporated into a client application (e.g., software) implemented at least in part by one or more of the computing devices. Examples of suitable computing devices include personal computers, server computers 604, desktop computers 606, laptop computers 607, notebook computers, tablet computers or personal digital assistants (PDAs) 610, smart phones 612, cell phones, and consumer electronic devices incorporating one or more computing device components, such as one or more electronic processors, microprocessors, central processing units (CPU), or controllers. Examples of suitable networks 614 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 608 may include multiple processing tiers, including a user interface tier 616, an application server tier 620, and a data storage tier 624. The user interface tier 616 may maintain multiple user interfaces 617, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, causing the execution of specific data processing operations, etc. Each application server or processing tier 622 shown in the figure may be implemented with a set of computers and/or computer components including computer servers and processors, and may perform various functions, methods, processes, or operations as determined by the execution of a software application or set of instructions. The data storage tier 624 may include one or more data stores, which may include a Service Data store 625 and one or more Tenant Data stores 626.

Each tenant data store 626 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

Distributed computing service platform 608 may be multi-tenant and service platform 608 may be operated by an entity in order to provide multiple tenants with a set of business-related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted with reference to FIG. 5, such business information systems may include an Enterprise Resource Planning (ERP) system that integrates the capabilities of several historically separate business computing systems into a common system, with the intention of streamlining business processes and increasing efficiencies on a business-wide level. Such functions or business applications are typically implemented by one or more modules of software code/instructions that are maintained on and executed by one or more servers 622 that are part of the platform's Application Server Tier 620.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. Such functions or business applications are typically implemented by one or more modules of software code/instructions that are maintained on and executed by one or more servers 622 that are part of the platform's Application Server Tier 620.

In addition to ERP and CRM functions, a business information system/platform (such as element 608) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 622 that are part of the platform's Application Server Tier 620.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may be integrated and executed by a single code base accessing one or more integrated databases as necessary, forming an integrated business management system or platform.

As noted with regards to FIG. 5, the integrated business system shown in FIG. 6 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, where individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business-related data that is resident on the platform. The extension may be developed by the tenant or by a $3^{rd}$ party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Tenant customizations to the platform may include custom functionality (such as the capability to perform tenant or user-specific functions, data processing, or operations) built on top of lower level operating system functions. Some multi-tenant service platforms may offer the ability to customize functions or operations at different levels of the service platform, from aesthetic modifications to a graphical user interface to providing integration of components and/or entire applications developed by independent third-party vendors. This can be very beneficial, since by permitting use of components and/or applications developed by third party vendors, a multi-tenant service can significantly enhance the functionality available to tenants and increase tenant satisfaction with the platform.

FIG. 7 is a diagram illustrating additional details of the elements or components of the multi-tenant distributed computing service platform of FIG. 6, in which an embodiment of the invention may be implemented. The software architecture shown in FIG. 7 represents an example of an architecture which may be used to implement an embodiment of the invention. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 7 is a diagram illustrating additional details of the elements or components 700 of a multi-tenant distributed computing service platform, in which an embodiment of the invention may be implemented. The example architecture includes a user interface layer or tier 702 having one or more user interfaces 703. Examples of such user interfaces include graphical user interfaces and application programming interfaces (APIs). Each user interface may include one or more interface elements 704. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote and may include interface elements such as parameterized procedure calls, programmatic objects and messaging protocols.

The application layer 710 may include one or more application modules 711, each having one or more sub-modules 712. Each application module 711 or sub-module 712 may correspond to a function, method, process, or operation that is implemented by the module or sub-module (e.g., a function or process related to providing ERP, CRM, eCommerce or other functionality to a user of the platform). Such function, method, process, or operation may include those used to implement one or more aspects of the inventive system and methods, such as for one or more of the processes or functions described with reference to FIGS. 3 and 4:

Training a machine learning model using information about a set of companies, products, or services and a label indicating whether each company, product or service is in compliance with a specific requirement or regulation. Examples of such information include, but are not limited to or required to include:
        web search engine results of the company name, product, or service with the compliance regulation or policy name(s)(such as GDPR, HIPAA);
        online websites owned by the company or associated with the product or service containing compliance, requirement or regulatory information;
        online information about the company, product, or service;
        surveys, reports or articles discussing compliance with specific regulations;
        industry groups that monitor or market their members' compliance or certification;
Applying the trained machine learning model to data regarding a different company, product, or service (not one used in the training process), the trained model operating on the input data or information to generate an output representing an indication of whether the different company, product, or service complies with or is likely to comply with a requirement or regulation (or combination of) which the model has been trained to evaluate compliance with (for example, a model may output a number on a normalized scale, a reference to a relative degree or likelihood, etc.);
    The model output may include a probability or confidence level in the likelihood of compliance with one or a combination of regulations, policies, requirements, protocols, etc.;
        If this probability or confidence level exceeds a predetermined threshold value, then interactions with the company and its products and services may be allowed;
        If this probability or confidence level does not exceed the predetermined threshold value, then interactions with the company and its products and services may be subject to one or more security policies, protocols, restrictions, or procedures;
Note that depending upon the form of the output produced by a model, the confidence level may not be used or needed. For example, if the model is trained to output a score or metric that is intended to indicate the relative likelihood of compliance, then the confidence level may not add any further information. To determine an optimal threshold with respect to the training set, one can use grid search (e.g., brute force search) for finding an optimal threshold. A higher threshold will result in fewer false positives, while a lower threshold will result in fewer false negatives. The threshold value(s) chosen will typically depend on the use case (e.g., the decision being made based on the model output) and how sensitive a system is to false positives or false negatives;
Based on the generated output of the model (for a likelihood of compliance falling below a threshold), identifying one or more security policies, protocols, restrictions, or procedures that could be applied to protect a person or organization from the risk posed by a non-compliant company, product, or service;
    Note that the security policy, protocol, restriction, or procedure applied may be specific to the regulation or requirement being considered—for example, if the regulation or requirement relates to network security, then the policy applied would typically involve protection of networks from intrusion or limiting the harm that might occur from unauthorized access;

Deciding upon and applying one or more specific security policy, protocol, procedure, restriction, or requirement to an organization, to its employees, or to a network or system to reduce the cybersecurity risk arising from a non-compliant company, product, or service, where as noted, the security measure(s) applied will generally depend on the type or nature of the compliance regulation or requirement. For example, non-GDPR compliant websites or vendors may be restricted by a security policy to not allow any upload or download of data or of personal data;

If applicable, implementing a more granular policy to condition, restrict, or block access by an organization and/or its employees with respect to certain types of interactions with a non-compliant company, product, or service, such as;

allowing partial use behind a firewall;

allowing use when accessed via a VPN or specific application;

allowing access/use with specific networks or devices;

preventing storage of certain data on a website; or allowing access when used in conjunction with a specific risk-monitoring software application;

If a company or product is in compliance with a requirement or regulation (or has a sufficiently high probability or likelihood of being complaint), then applying a security policy that permits access to a company's website and/or use of its products and services; and Repeating an evaluation of a company on a regular basis to detect changes in compliance status, etc.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 622 of FIG. 6) may include each application module. Alternatively, different application servers may include different sets of application modules. Such sets may be disjoint or overlapping.

The data storage layer 720 may include one or more data objects 722 each having one or more data object components 721, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 5-7 are not intended to be limiting examples. Further example environments in which an embodiment of the invention may be implemented in whole or in part include devices (including mobile devices), software applications, systems, apparatuses, networks, SaaS platforms, IaaS (infrastructure-as-a-service) platforms, or other configurable components that may be used by multiple users for data entry, data processing, application execution, or data review.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

In some embodiments, certain of the methods, models or functions described herein may be embodied in the form of a trained neural network, where the network is implemented by the execution of a set of computer-executable instructions. The instructions may be stored in (or on) a non-transitory computer-readable medium and executed by a programmed processor or processing element. The specific form of the method, model or function may be used to define one or more of the operations, functions, processes, or methods used in the development or operation of a neural network, the application of a machine learning technique or techniques, or the development or implementation of an appropriate decision process. Note that a neural network or deep learning model may be characterized in the form of a data structure in which are stored data representing a set of layers containing nodes, and connections between nodes in different layers are created (or formed) that operate on an input to provide a decision, classification, or value as an output.

In general terms, a neural network may be viewed as a system of interconnected artificial "neurons" that exchange messages between each other. The connections have numeric weights that are "tuned" or set during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a dataset of inputs in an assortment of representative input patterns that are associated with their intended output response (e.g., a label). Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:
1. A method of reducing cybersecurity risk, comprising:
inputting data regarding a company into a trained machine learning model, the trained model responding to the input data by generating an output indicating whether the company complies with a specific regulation or regulations that the model was trained to detect compliance with;

obtaining the output from the trained model, the output representing an indication of whether the company complies with the specific regulation or regulations and an indication of a confidence level in that compliance;

generating a measure of cybersecurity risk to a person that would result from accessing the services or products of the company;

combining the generated measure of cybersecurity risk with one or more other sources of risk to determine a measure of a total risk to an organization from the person, wherein the combining is performed as indicated by a risk modeling structure, the risk modeling structure representing a set of contributions to cybersecurity risk for each of one or more risk categories; and based on the measure of the total risk to the organization from the person, applying a security policy or process to the person.

2. The method of claim 1, wherein the input data regarding the company includes one or more of the company name, the URL of a website associated with the company, results of a search for the company name, results of a search for companies in compliance with the specific regulation, a product provided by the company, and a service provided by the company.

3. The method of claim 1, wherein the specific regulation is one related to data security, network security, or data privacy.

4. The method of claim 1, wherein the risk modeling structure comprises a risk modeling tree.

5. The method of claim 1, wherein the one or more risk categories comprise Attacked People, Privileged People, and Vulnerable People.

6. The method of claim 1, wherein the person accesses the services or products of the company by one or more of use of a product or service provided by the company, accessing a website associated with the company, or entering data into a form or webpage associated with the company.

7. The method of claim 1, wherein if the confidence level that the company complies with the specific regulation exceeds the threshold value, then a restriction is not imposed on interactions with the company by persons in the organization.

8. The method of claim 1, further comprising training the machine learning model, wherein training the machine learning model includes:

identifying a regulation of interest;

collecting a plurality of data sets, each data set including data regarding a company and a product or service provided by the company;

processing each data set to determine an indication of whether the company, product, or service provided by the company complies with the regulation;

labeling each data set with a label that indicates whether the company, product, or service provided by the company complies with the identified regulation; and applying a machine learning algorithm to the plurality of data sets and associated labels to train the machine learning model.

9. The method of claim 1, further comprising:

determining a measure of cybersecurity risk for the organization, wherein the organization includes one or more persons who use the company's products or services; and based on the measure of cybersecurity risk for the organization, applying a security policy or process to the organization.

10. The method of claim 9, wherein the security policy or process applied to the person or to the organization include one or more of:

preventing entering data into a website or form hosted by the company;

preventing sending of customer data to the company;

preventing sending of unencrypted data to the company;

preventing downloading of an application provided by the company;

preventing granting access, by the company to data or services hosted by the organization;

preventing execution of specific data processing or data storage operations using a product or service provided by the company; or preventing providing any personal identification information to the company.

11. A system comprising:

at least one electronic processor; and an electronic non-transitory computer-readable medium including a set of computer-executable instructions that, when executed by the electronic processor, cause the system to input data regarding a company into a trained machine learning model, the trained model responding to the input data by generating an output indicating whether the company complies with a specific regulation or regulations that the model was trained to detect compliance with;

obtain the output from the trained model, the output representing an indication of whether the company complies with the specific regulation or regulations and an indication of a confidence level in that compliance;

generate a measure of cybersecurity risk to a person that would result from accessing the services or products of the company;

combine the generated measure of cybersecurity risk with one or more other sources of risk to determine a measure of a total risk to an organization from the person, wherein the combining is performed as indicated by a risk modeling structure, the risk modeling structure representing a set of contributions to cybersecurity risk for each of one or more risk categories; and based on the measure of the total risk to the organization from the person, apply a security policy or process to the person.

12. The system of claim 11, wherein the input data regarding the company includes one or more of the company name, the URL of a website associated with the company, results of a search for the company name, results of a search for companies in compliance with the specific regulation, a product provided by the company, and a service provided by the company.

13. The system of claim 11, wherein the specific regulation is one related to data security, network security, or data privacy.

14. The system of claim 11, wherein the one or more risk categories comprise Attacked People, Privileged People, and Vulnerable People.

15. The system of claim 11, wherein the person accesses the services or products of the company by one or more of use of a product or service provided by the company, accessing a website associated with the company, or entering data into a form or webpage associated with the company.

16. The system of claim 11, wherein the security policy or process applied to the person includes one or more of:
   preventing entering data into a website or form hosted by the company;
   preventing sending of customer data to the company;
   preventing sending of unencrypted data to the company;
   preventing downloading of an application provided by the company;
   preventing granting access by the company to data or services hosted by the organization;
   preventing execution of specific data processing or data storage operations using a product or service provided by the company; or
   preventing providing any personal identification information to the company.

17. The system of claim 11, wherein the set of computer-executable instructions further cause the system to:
   determine a measure of cybersecurity risk for the organization, wherein the organization includes one or more persons who use the company's products or services; and
   based on the measure of cybersecurity risk for the organization, apply a security policy or process to the organization.

18. A set of one or more non-transitory computer-readable media containing instructions that when executed by one or more programmed electronic processors, cause a system that includes the one or more processors to:
   input data regarding a company into a trained machine learning model, the trained model responding to the input data by generating an output indicating whether the company complies with a specific regulation or regulations that the model was trained to detect compliance with;
   obtain the output from the trained model, the output representing an indication of whether the company complies with the specific regulation or regulations and an indication of a confidence level in that compliance;
   generate a measure of cybersecurity risk to a person that would result from accessing the services or products of the company;
   combine the generated measure of cybersecurity risk with one or more other sources of risk to determine a measure of a total risk to an organization from the person, wherein the combining is as indicated by a risk modeling structure, the risk modeling structure representing a set of contributions to cybersecurity risk for each of one or more risk categories; and
   based on the measure of the total risk to the organization from the person, apply a security policy or process to the person.

19. The set of computer-readable media of claim 18, wherein the input data regarding the company includes one or more of the company name, the URL of a website associated with the company, results of a search for the company name, results of a search for companies in compliance with the specific regulation, a product provided by the company, and a service provided by the company.

20. The set of computer-readable media of claim 18, wherein the security policy or process applied to the person includes one or more of:
   preventing entering data into a website or form hosted by the company;
   preventing sending of customer data to the company;
   preventing sending of unencrypted data to the company;
   preventing downloading of an application provided by the company;
   preventing granting access by the company to data or services hosted by the organization;
   preventing execution of specific data processing or data storage operations using a product or service provided by the company; or
   preventing providing any personal identification information to the company.

* * * * *